United States Patent [19]

Sanseverino

[11] Patent Number: 5,765,408
[45] Date of Patent: Jun. 16, 1998

[54] LARGE VEHICLE STEERING COLUMN LOCK MECHANISM

[76] Inventor: John Sanseverino, 20 Munich Rd., Carmel, N.Y. 10512

[21] Appl. No.: 771,907

[22] Filed: Dec. 23, 1996

[51] Int. Cl.⁶ .................................................. B60R 25/02
[52] U.S. Cl. .............................. 70/14; 70/56; 70/182; 70/183; 70/237
[58] Field of Search ........................... 70/2, 14, 54–56, 70/237, 51, 182, 183, 206, 212, 253

[56] References Cited

U.S. PATENT DOCUMENTS

| | | | |
|---|---|---|---|
| 977,533 | 12/1910 | Myers | 70/182 |
| 1,020,930 | 3/1912 | Seeley | 70/182 |
| 1,346,135 | 7/1920 | Ritchie | 70/182 |
| 3,453,846 | 7/1969 | Owen et al. | 70/54 |
| 4,538,435 | 9/1985 | Romero | 70/183 |
| 4,581,907 | 4/1986 | Eberly | 70/54 |
| 4,658,609 | 4/1987 | Mickelson | 70/212 X |
| 4,781,043 | 11/1988 | Loeffler | 70/54 |

*Primary Examiner*—Lloyd A. Gall
*Attorney, Agent, or Firm*—Martin J. Spellman, Jr.

[57] ABSTRACT

A locking mechanism for securely locking a universal joint of the steering column of a heavy duty motor vehicle, the locking mechanism has a tampered tang or end of which passes through the universal joint. The end of the tang passing through the universal joint has an aperture therethrough for receiving the hasp of a lock container within a locking mechanism body. The locking mechanism body prevents access to the lock hasp to prevent breaking the lock. The tang is tapered to prevent its withdrawal from the lock body by cutting off the outer end of the tang.

1 Claim, 7 Drawing Sheets

LARGE VEHICLE STEERING COLUMN LOCK MECHANISM

BACKGROUND OF THE INVENTION

1. Field of the Invention

The present invention is concerned with providing a means for inhibiting the theft or unauthorized operation of large vehicles having steering columns with universal joints that are accessible from, or located in, the driver's compartment of the vehicle. It is further concerned with providing an extremely secure anti-vandalism lock that is placed on and through the universal joints of the steering column of heavy duty vehicles. Such vehicles are subject to a high incidence of theft and usually are extremely expensive vehicles to replace.

2. Prior Art

Vehicles wherein the ignition lock have been utilized to lock the steering column in place to deter theft have been manufactured for a considerable period of time. Such systems which are generally used on passenger vehicles are easily thwarted since they are readily accessible to a thief who can by-pass or disable them, or remove them with minimal effort and light-weight tools.

In the case of heavy duty vehicles, such as tractor cabs for semi-trailer trucks and many large industrial vehicles which can cost over $100,000.00 and up to several hundreds of thousands of dollars and are the target of specialized thieves, existing anti-theft means for such vehicles are woefully inadequate against professional thieves.

Because of the size of the vehicles, a very effective means of preventing theft would be attained simply if the steering column could be securely locked in one position by a low-cost device that was secured from commonly used burglary tools, but easily removed by authorized users when it is desired to operate the vehicle.

In the case of diesel powered vehicles, to have such a means of locking the steering column securely against potential thieves is especially beneficial since in low temperature weather locations it is often necessary to leave the vehicle engine running because of the difficulty often encountered in restarting the engine without special weather gear. Such vehicles are easy targets for the thieves. All that has to be done is to break into the cab area and drive the vehicle away since the engine is already running.

The insurance industry has been desirous of finding an effective deterrent to prevent the often easy theft of these vehicles because of the significant losses involved in such thefts.

The utilization of various locking means to lock a vehicle steering column against rotation has been known in the art since the early stages of motor vehicle development.

For instance U.S. Pat. No. 1,226,384—Smith dated Apr. 6, 1920 discloses an auto lock which is applied to the steering post and the casing thereof so that the post can be locked against rotation.

The lock comprises a lock pin which can be pushed through diametrically opposed openings in the casing and a transverse opening in the steering post, causing its inner end to engage the bolt which is provided with a notched out portion adapted to partially encircle the pin, thus locking the locking pin against removal (Col. 2, Line 90).

U.S. Pat. No. 977,533—Myers, issued as early as 1910 shows a bicycle lock to prevent rotation of the handle bar steering column. A key having a bent hook head 13 at one end is passed through registering slots in the steering post. The other end of the key protrudes from the post and a loop therein is passed through the hasp of a padlock. A padlock is passed through the hasp in the protruding extremity of the key and the steering post is secured against movement. A person holding the key to the padlock can remove the lock and use the bicycle. The padlock is easily exposed to being hacksawed, or filed off by a potential thief.

U.S. Pat. No. 1,020,930—Seeley discloses a locking device for a vehicle wherein a pin is passed through the steering column and shaft thereof and a padlock placed on the end of the pin which is passed through the columns. There is also a plate utilized as part of the locking mechanism. The lock in this case is simply a padlock, the hasp of which is exposed and is easy cut off, and the bypass the lock.

Ritchie—U.S. Pat. No. 1,346,135 also discloses a lock for a vehicle which utilizes a padlock to secure a pin through the steering column and shaft. It is provided with hinged arms which cover the pin.

The lock is easily violated simply by sawing the hasp off the padlock.

In Ritter—U.S. Pat. No. 1,259,433 a pin is passed through the steering column to lock it. The pin is secured centrally to a forked plate which is held in place by an exposed padlock.

The foregoing prior art references are representative but not exhaustive of the developments in this area.

SUMMARY OF THE INVENTION

The present invention provides an anti-theft mechanism for preventing the unauthorized use or theft of heavy duty motor vehicles which have steering columns that are comprised of at least one universal joint located in the driver's compartment and/or which is accessible from inside the driver's compartment.

In accordance with the present invention a tamperproof locking mechanism for securing against a vehicle theft, which vehicle has a steering column with at least one universal joint within the driver's compartment that is accessible from the driver's compartment is provided.

The locking mechanism, preferably constructed of hardened steel components, comprises a tapered tang portion, lock means such as a heavy duty padlock preferably a Master brand lock, and a lock body. The tapered tang portion passes through an opening of the universal joint of the steering column to prevent rotation of the column and thus operation of the vehicle to accomplish a theft.

A knob means is provided at the larger end of the tang to facilitate handling. The tang is tapered below the large knob end toward the opposite end. The taper is to foil a thief who would attempt to penetrate the locking mechanism by sawing off the knob handle end of the tang portion. Since the tang is tapered, even if the outer end is removed the taper will prevent the tang from passing through the opening in the lock body through which the tang normally passes. An aperture is provided near the inner end of the tang which passes into the block or lock body portion of the lock and is secured by one hasp arm of the Master padlock hasp which is passed through the aperture when the lock is secured.

The inverted U-curve of the hasp of the padlock passes over a cross arm within the lock body which holds the padlock in place and prevents it from becoming separated from the lock body.

It is impossible for a thief to gain access to the hasp of the lock mechanism since all approaches are blocked by the bulky lock body and the close tolerances which are utilized throughout. The block portion of the lock has various extensions to prevent a saw from reaching the extension of the tapered tang near its inner end where it enters within the lock body. There is no practical way of by-passing this lock mechanism except with the use of a cutting torch or by removing the steering column completely from the vehicle, all of which would take too long to effectuate a theft in the usual times available, and/or would render the truck undriveable.

BRIEF DESCRIPTION OF THE DRAWING

In the accompanying drawings which form a part of the application.

ILLUSTRATIVE SPECIFIC EMBODIMENT

Referring to accompanying drawing which illustrates the lock mechanism of the present invention and shows it securing a universal joint, the lock mechanism in general is referred to throughout by the number 2.

Figures 1, 2:
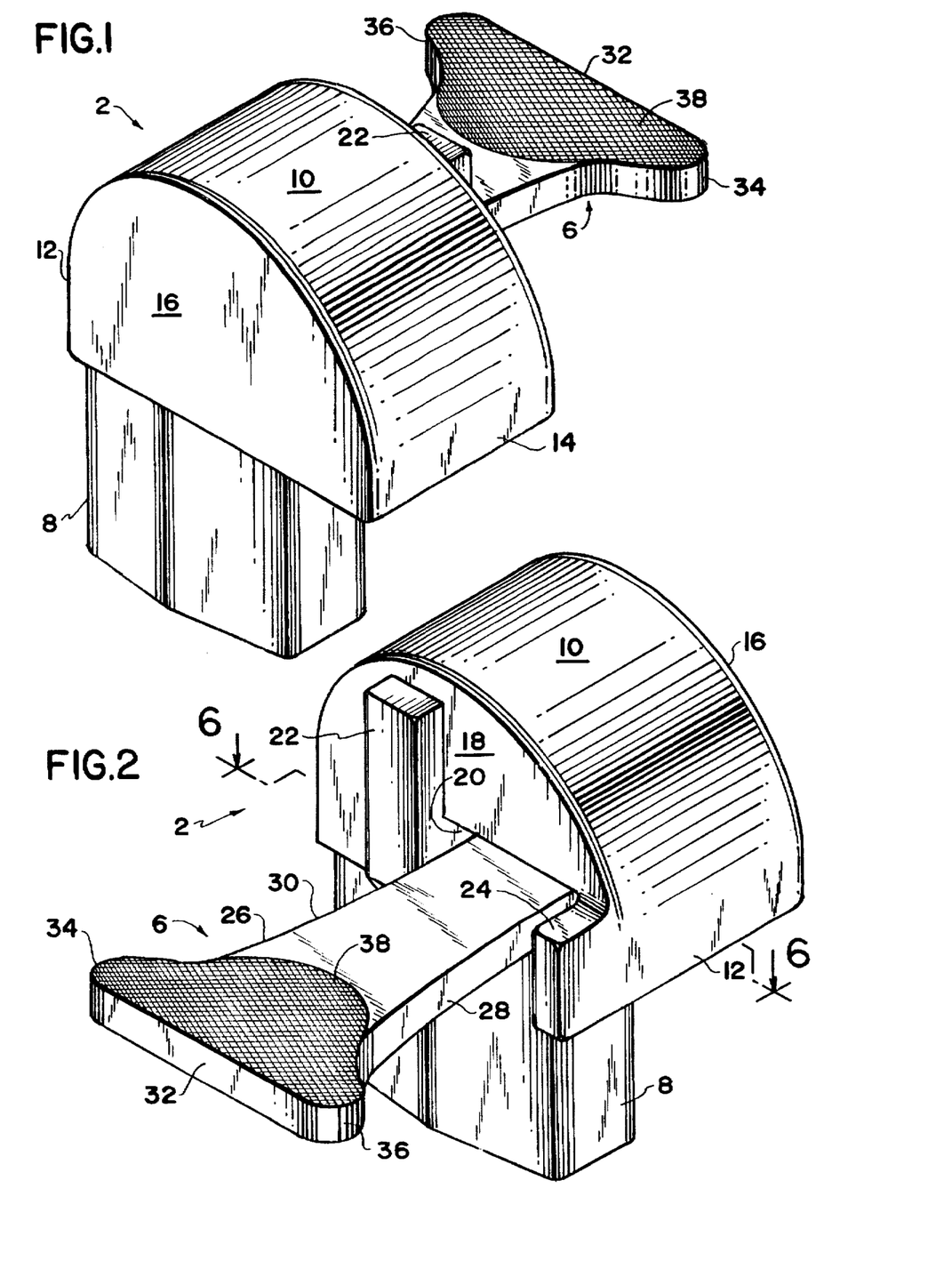
FIG. 1 is an overall perspective view of the lock mechanism of the present invention shown by itself in the closed and locked position.
FIG. 2 is a perspective view of the lock mechanism in the locked position and oriented 180° about the vertical axis from the view shown in FIG. 1.

As shown in FIGS. 1 and 2, the main components of the lock mechanism 2 which cooperate with a steering wheel 105 and steering column 106 comprise body 10, tang 6, and the heavy duty padlock 8. The body 10 of the lock mechanism 2 has an arcuate top extending down to curved sides 12 and 14. The lock body 10 has a rear wall 16 and front wall 18 with a lower-portion 20 being partially open to position the padlock 8 in place as described below.

Tang 6 has side edges 28 and 30 of tang shaft extension 26. The tang head 32 has outwardly extending lateral ears 34 and 36 to facilitate grasping the head 32 of the tang 6. Further facilitating the handling of the tang 6 or manipulation thereof are the textured outer surfaces 38 on the head 32. Inwardly from the inner end 40 of tang 6 is a round aperture 42 through which the hasp 50 of the padlock 8 will pass as described below.

The front end 18 of the lock body 10 has an opening 20 adjacent to which there is an upright rectangular projection 22 which serves to preclude placing a saw or a file against the shaft 26 of tang 6 along its side edge 30. On the other side of the front wall 18 of the lock body 4, extending lateral projection 24 serves to prevent hacksaw access from that direction against side 28 of the shaft 26 of tang 6.

The padlock 8 is secured within the body 10 of the lock mechanism 2 by the hasp 50 passing over the longitudinal crossbar 104 running from the front wall 18 to rear wall 16 of the lock body 10. The bar 104 is welded to the walls 16 and 18. The padlock hasp 50 is spaced from the walls, but close enough so that the padlock 8 may not be removed from the body 10 of the lock mechanism 2.

The hasp 50 of the padlock 8 swivels in the body 47 of the padlock 8, pivoting and extending in the usual manner. The recess 48 on the top of the padlock body 47 retains the notched free end 56 of the hasp 50 of the lock 8 in the usual manner. A key 46 is shown extending from the bottom 88 of the padlock 8 in the usual manner.

Figure 3:
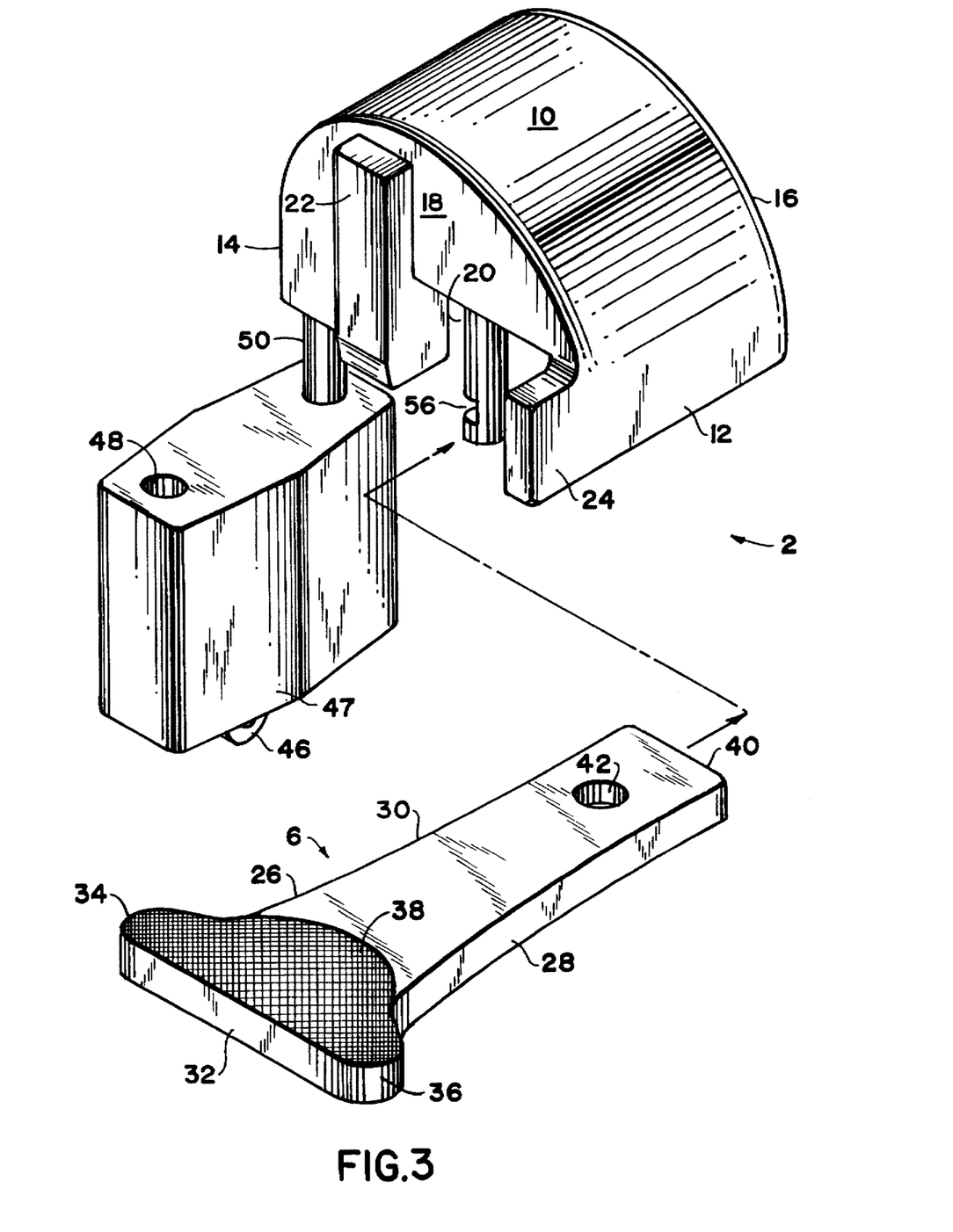
FIG. 3 is a perspective view of the lock mechanism from the same angle as that in FIG. 2 with the padlock opened and body thereof swung away from the closed position, and the tang portion of the lock mechanism separated from the lock block and padlock.

Tang 6, as shown in FIG. 3, has an inner end 40. Inwardly and centrally located from the end 40 of tang 6 is an aperture 42 through which the notched free end 56 of the lock hasp 50 will pass when in place in the lock body 10 in the locked condition.

Figure 4:
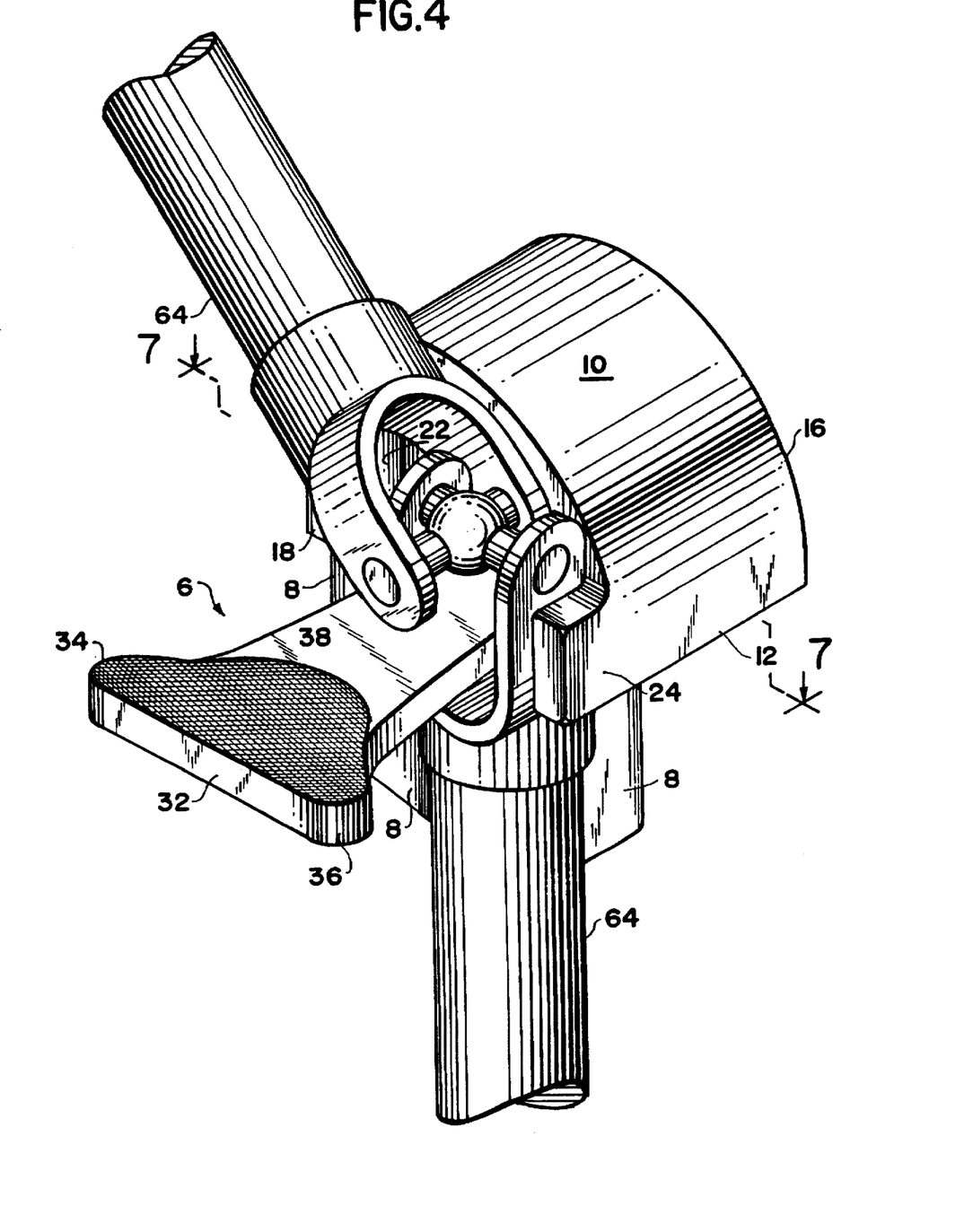
FIG. 4 is a perspective view shown at the same angle as FIGS. 2 and 3 of the lock mechanism closed in place on, and locking a vehicle universal joint.

The lock mechanism 2 in its closed, locked condition is shown in FIG. 4 locking a universal joint 64 against rotation. The tang 6 passes through the open portion of the universal joint 64 and thus prevents the universal joint 64 from being rotated.

Figure 5:
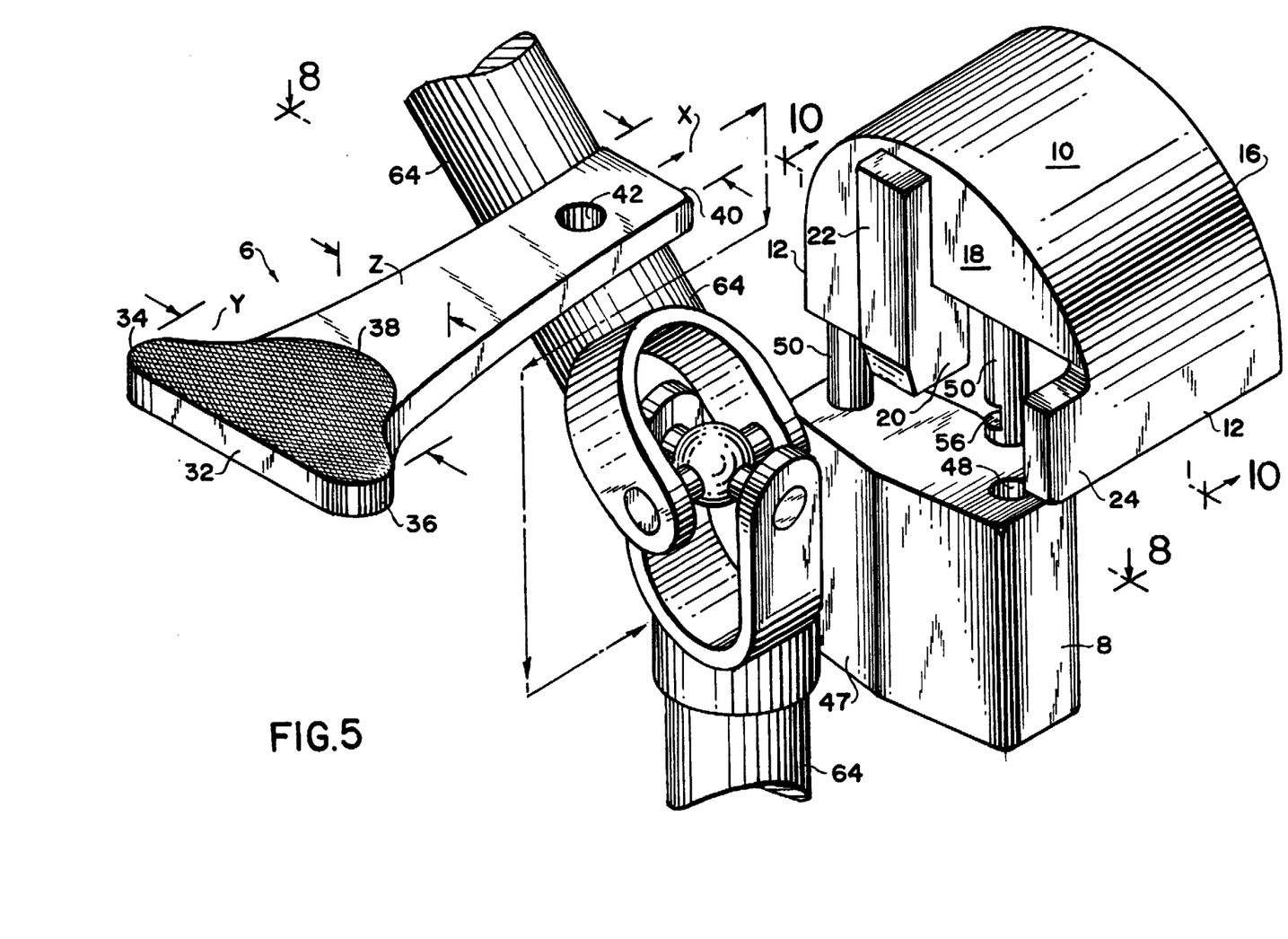
FIG. 5 is a perspective exploded view from the same angle as in FIG. 4 view showing the universal joint, tang of the lock mechanism, lock body with the padlock, and their relationship to the universal joint prior to locking, the lock block with the padlock portion being unlocked and ready to receive the end of the tang after it passes through the universal joint.
Figures 6, 7:
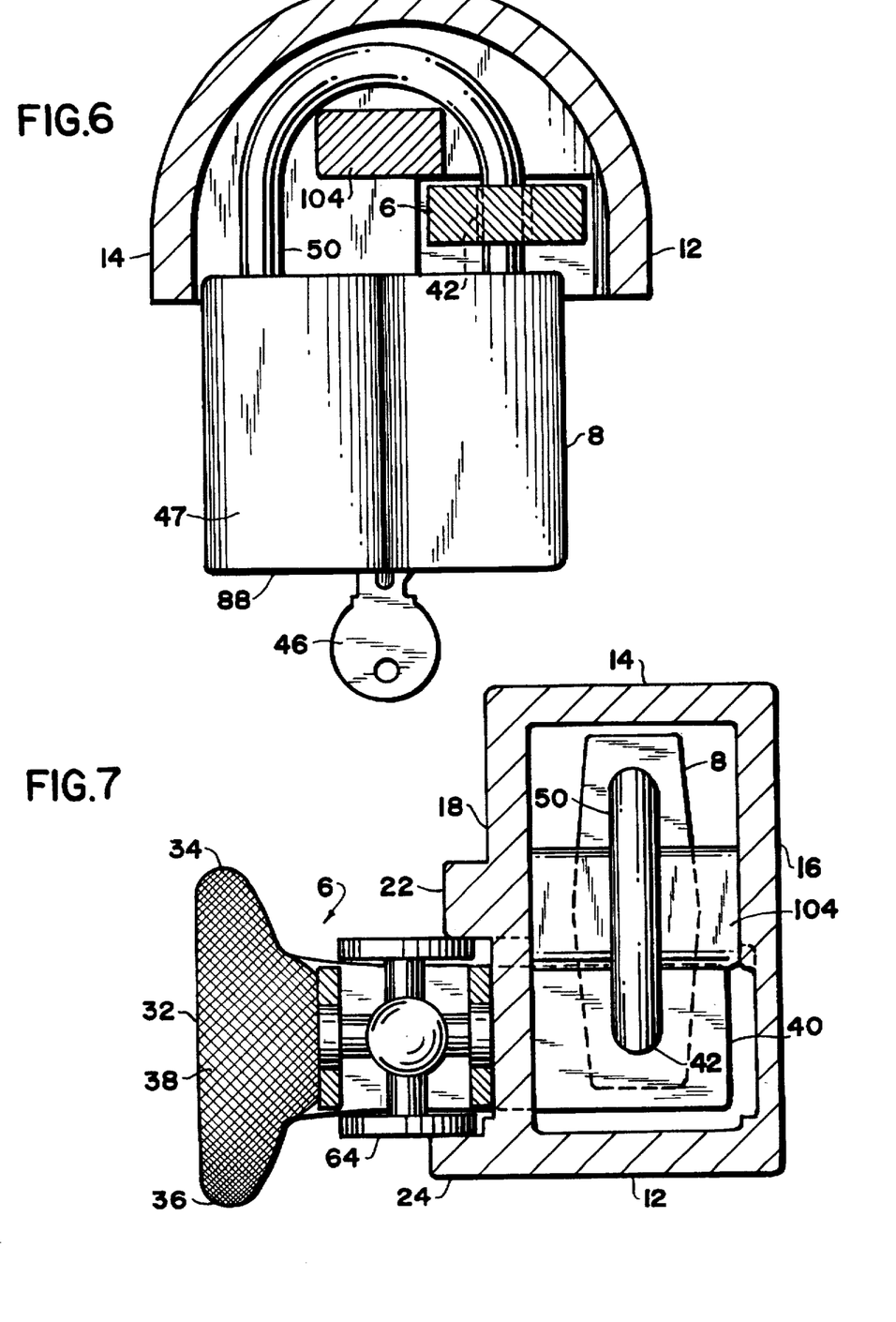
FIG. 6 is a sectional view along lines 6—6 of FIG. 2 showing the interior of the lock body with the tang engaged over which the hasp of the lock passes; and the cross bar over which the padlock passes within the lock body.
FIG. 7 is a top view, partially in section, along the lines 7—7 of FIG. 4 showing the lock tang engaging the universal joint in its locked position and the padlock hasp passing through the aperture in the tang end.
Figure 8:
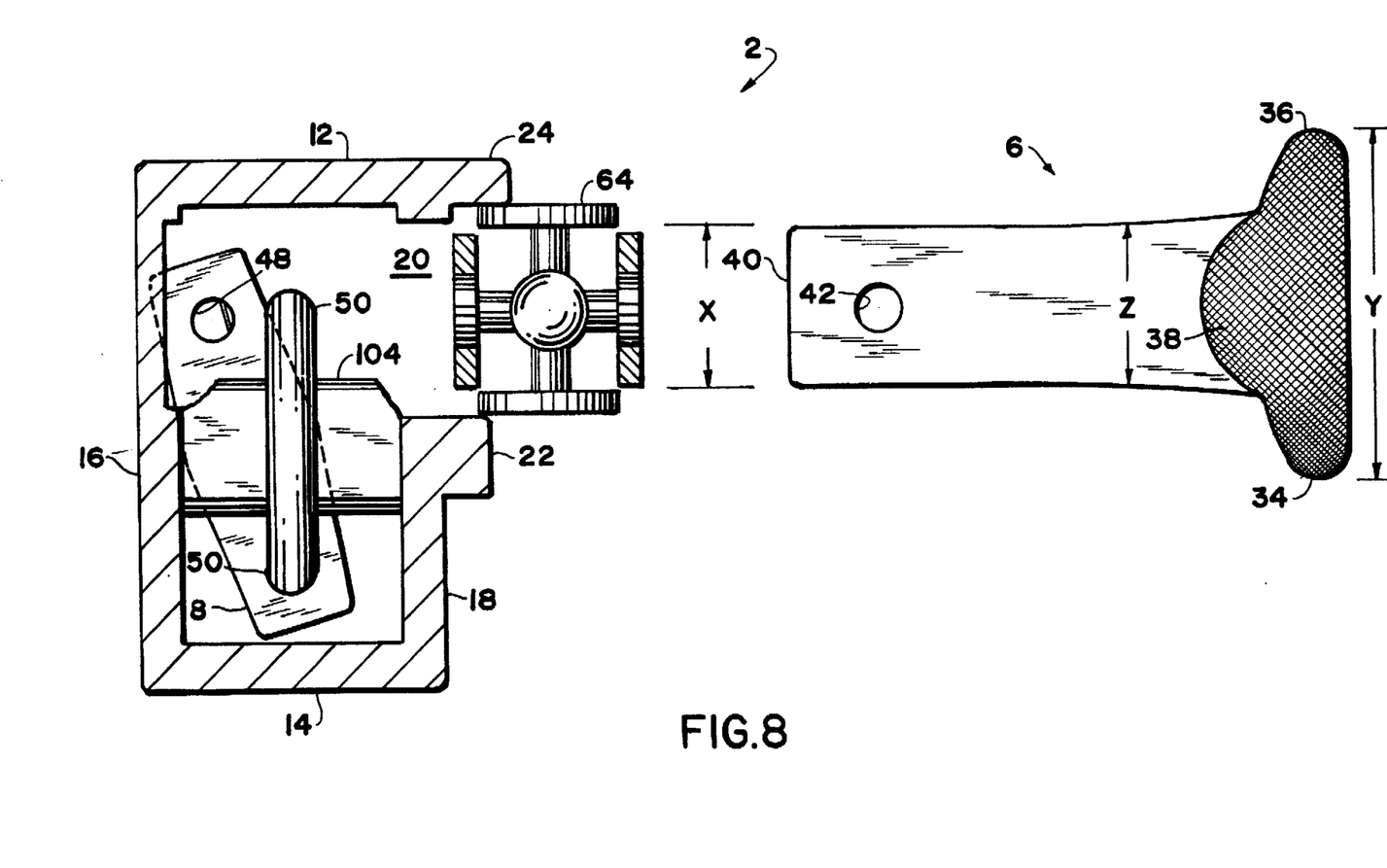
FIG. 8 is an exploded top view, partially in section, showing the lock mechanism in the unlocked position with the block portion in section along lines 8—8 of FIG. 5 and tang portion separated; the padlock open, and the universal joint not engaged by the lock mechanism.
Figures 9, 10:
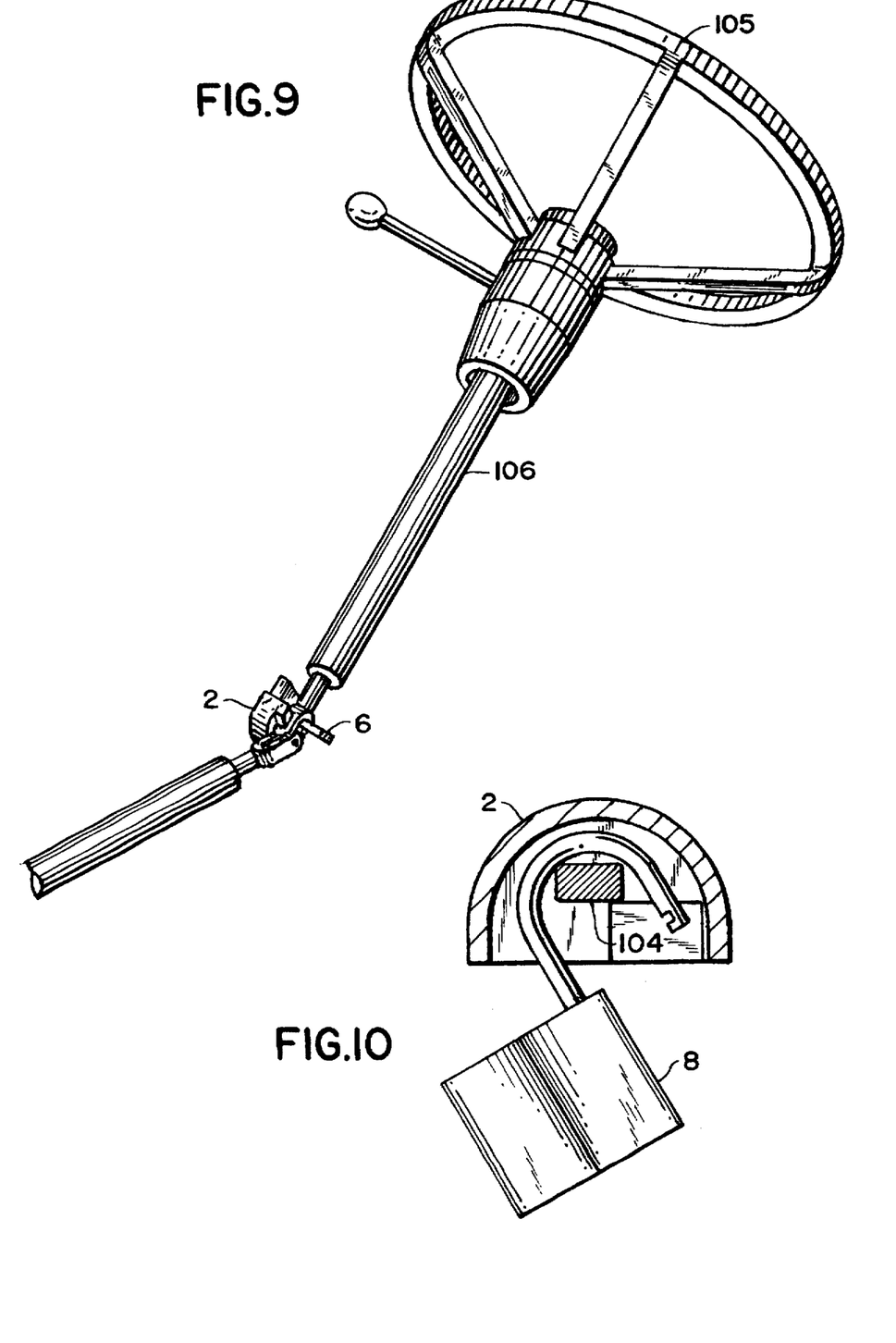
FIG. 9 is a perspective view of a heavy duty vehicle the upper portion of the steering column and a universal joint, having the lock mechanism in place on the universal joint.
FIG. 10 is a sectional view along lines 10—10 of FIG. 5, but with the padlock opened and the tang removed.

In FIG. 5 the padlock 8 is shown opened, the notched end 56 of the hasp 50 passing through the aperture 42 in the tang 6. This allows the tang 6 to be withdrawn from the lock body 10 and from the universal joint 64, allowing the universal joint 64 to rotate unimpeded.

It is apparent that when the lock mechanism 2 is in the closed position, the projections 22 and 24 preclude a saw or file from being positioned to act upon either end of the hasp 50 of the padlock 8 or on the portion the padlock tang 6 within the universal joint.

In the accompanying drawings the dimension X is the width of shaft 26 of the tang 6 at its inner end 40, Z at its outer region where it emerges from the universal joint 64 and at the head 32.

X is slightly lesser than the opening in the universal joint and the distance between projections 22 and 24; Z is larger than the distance between projections 22 and 24 and increases towards the head 32 of tang 6. Y is any suitable dimension to facilitate handling of tang 6.

The lock body 10 is comprised of very thick—preferably at least ¼ to ½, hard steel so that it is impossible to cut or saw through the lock body 10 or locked hasp 50 within a period of time that a thief would require to successfully steal the vehicle in which the lock is applied to the steering column universal joint.

While the invention has been described by reference to an illustrative embodiment, it is not intended that the novel device be limited thereby, but that modifications thereof are intended to be included as falling within the broad spirit and scope of the foregoing disclosure, the following claims and the appended drawings.

What is claimed is:

1. A lock mechanism to inhibit the theft of a heavy duty motor vehicle, which vehicle has at least a portion of a steering column including a universal joint located within an operator's cab of said vehicle, said lock mechanism comprising: a lock body of penetration resistant material and including a closed top, closed opposing first and second ends, and closed opposed sides, an opening formed in said first end in the lower portion thereof and above lower terminal portions of said sides, an upright extension generally perpendicular to and adjacent to a first side of said first end opening, and a lateral extension of the same approximate height as said first end opening adjacent to a second side of said first end, at least one said extension extending outwardly from said first end, a cross member generally parallel to said sides and spaced downwardly from an interior surface of said top, interior surfaces of said sides being sufficiently distant from said cross member to allow a lock hasp to pass therebetween, a tang member having a tapered outer end having dimensions larger than said end opening, said tang member having an inner end, an aperture in said tang member inner end perpendicular to the lateral dimension thereof and of a sufficient size so that the hasp of said lock may pass therethrough, and whereby said extensions preclude cutting an inward portion of said tang member.

* * * * *